United States Patent [11] 3,632,257

| [72] | Inventor | Naoyoshi Ashizawa<br>No. 101 Shoankita-machi, Sugenami-ku, Tokyo, Japan |
|---|---|---|
| [21] | Appl. No. | 855,330 |
| [22] | Filed | Sept. 4, 1969 |
| [45] | Patented | Jan. 4, 1972 |

[54] APPARATUS FOR MAKING GRANULES
7 Claims, 2 Drawing Figs.

[52] U.S. Cl................................................. 425/222,
23/313, 34/168, 118/62, 118/303, 264/117
[51] Int. Cl......................................................... B29b 1/03,
B29c 23/00
[50] Field of Search............................................ 264/68,
117; 23/313, 314; 118/62, 303; 34/168, 188; 18/1 A

[56] References Cited
UNITED STATES PATENTS

| 3,117,027 | 1/1964 | Lindlof et al. | 118/303 |
| 3,142,862 | 8/1964 | Guldman | 18/1 A |
| 3,278,661 | 10/1966 | Beck | 18/1 A |
| 3,386,182 | 6/1968 | Lippert | 118/303 X |
| 3,394,430 | 7/1968 | Stephanoff et al. | 18/1 A |
| 3,408,746 | 11/1968 | Reynolds et al. | 118/303 |
| 3,514,510 | 5/1970 | Hoffman, Jr. | 264/117 |

*Primary Examiner*—Robert L. Spicer, Jr.
*Attorney*—Jay M. Cantor

ABSTRACT: This invention pertains to a method and device for manufacturing granules by the controlled cohesion of particles. The method consists in producing a spiralling up and downstream of particles by means of jets of pressurized gas and of sprinkling suitable granulating agents onto the outer layers of the stream of particles, or on to the inner layers, or by coating the particles with suitable granulating agents prior to producing the spiralling up and downstream of the particles by the pressurized gas and thereby producing granules by cohesion of the particles. The device comprises a towerlike cylindrical vessel with conical top and bottom sections, the bottom section mounting a plurality of gas ejecting nozzles forming a ring with the nozzles pointing tangentially upwards to produce the spiralling stream of particles. The top conical section has a gas exhaust port at its apex for exhausting the gas. A feeder pipe and valve for loading the vessel, and a sprinkler nozzle and supply pipe for ejecting granulating agents, when required are mounted on the top sidewalls of the cylindrical section.

PATENTED JAN 4 1972

3,632,257

INVENTOR.
N. Ashizawa
BY Harold L. Halpert
Agent

APPARATUS FOR MAKING GRANULES

This invention pertains to a method for manufacturing granules, and a device which utilizes this method, and is usefully adapted to manufacture granulated food powders, pharmaceutical products and industrial chemical products.

An object of this invention is to furnish a method and device for producing granules which have a uniform granular texture.

Another object of this invention is to furnish a method and device for manufacturing granules whereby the quantity of the granulating agent which is ejected into the particles stream or coated on to the particles can be a small controlled amount and thereby is economical and serves to efficiently produce granules of a highly marketable quality with good commercial value.

Still another object of this invention is to furnish a method and a device for manufacturing granules wherein the drying out process of the granules, after cohesion of the particles takes place, can be started without loss of time and accomplished economically.

Yet another object of this invention is to provide a method and device for manufacturing granules wherein a plurality of adjustable nozzles produce a spiralling jet stream. The adjustment consists in adjusting the angle of the nozzles from a horizontal plane and thereby controlling the dwell time for the particles and fused particles within the spiral stream.

Figure 1:
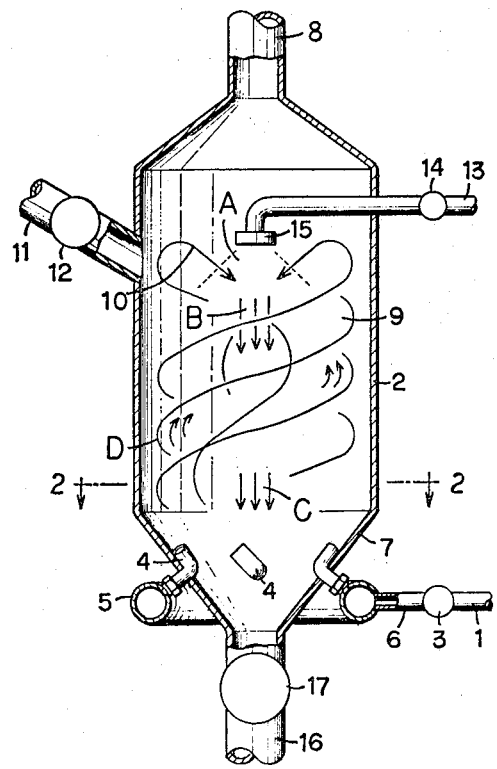
FIG. 1 is a vertical sectional view of the device.
Figure 2:
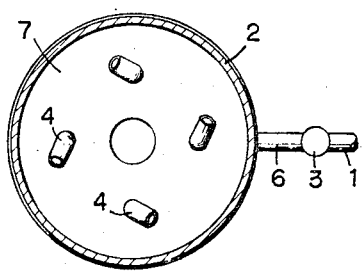
FIG. 2 is a cross section view along 2—2 of FIG. 1.

To further explain the invention by means of one example of a device embodying the principles of the invention, reference is made to the drawing wherein a supply pipe 1 supplies pressurized gas to form a stream of particles within towerlike vessel 2. The pipe is attached to a suitable pressurized gas source. Normally air is used for the gaseous medium, however, other gases such as pressurized carbon dioxide, nitrogen, etc., may be used depending on the characteristics of the particles. The pressurized gas is introduced after being conditioned as to temperature, (hot or cold) and dryness, to best suit the basic particles. Gas flow control valve 3 controls the flow of gas to obtain optimum conditions depending on the density, size, characteristic, quantity and nature of the binder or granulating agent of the particles, and also on the size of the granules, the shape and characteristics of the product. Nozzles 4 are adjustably mounted on ring manifold 5 which connects to feedpipe 1 through connecting pipe 6. The axes of nozzles 4 are parallel to the sides of bottom cone 7 and are at an angle to the horizontal plane formed by the ring nozzles, this angle being adjustable within the range of 15°–65°. When pressurized gas is ejected from the nozzles, the particles contained within the vessel are jettisoned against the wall of the vessel and rise spirally along the cylindrical wall. As the force of the gas jet diminishes, the particles slow down and descend through the center of the vessel at point 10. The gas pressure is exhausted through port 8 and is returned to the compressor through a suitable filter or is exhausted into the atmosphere.

Fused particles formed into granules leave the uppermost stream surface and start dropping downwards through the center of the vessel; when the granulated product approaches the bottom, it is jettisoned upwards again by the pressurized gas jets at the bottom of the vessel. Lines 9 depict the spiralling upward stream of granules.

The particles to be treated are loaded into the vessel through pipe 11 and the quantity is controlled by valve 12.

Supply pipe 13 is connected at one end to the pressurized source for the granulating medium. The other end is terminated in the approximate center of the vessel 2 by a nozzle 15. The amount of granulating agent is controlled by valve 14. The granulating agent is normally used to bind the particles together, and is selected according to the nature of the particles. In the event that the particle is water-soluble, and the dissolved part of the particle tends to be sticky, such as dextrose (glucose) lactose, then water is used for the granulating agent. Also, depending on the nature of the particle, pasty substances, powders, gases and volatile solvents can be used. The amount of granulating agent is controlled by valve 14 and depends on the size of the particle, the characteristics, quantity, and time for granulating. When the granulating agent is being applied to the particles, valve 14 is closed and no further granulating agent is ejected into the vessel.

In the depicted device herein described, nozzle 15 is placed in a position above point 10 where the granules reach the outer uppermost strata of the spiralling stream and start their their downward descent. The nozzle 15 is positioned to eject the granulating agent in a downward direction, however, supply pipe 13 and nozzle 15 can be placed lower in the cylinder within the descending stream of granules and can be positioned to eject the granulating agent in either an upward or a downward direction.

Bottom conical section 7 has exhaust valve 17 with exhaust pipe 16 at its lowest point. Granules of the proper texture formed by the spiralling up and down motion within the towerlike cylinder can be removed if necessary through valve 17 and pipe 16.

The pressure and amount of pressurized gas ejected from nozzles 4 affects the texture of the granules and their characteristics and is also dependent upon the quantity of particles involved. As an example, for a batch weighing 100 kg. the gas pressure should be 300–1,500 mm.Aq. the gas volume 3–15 m.³/min. In other words the pressure and volume of gas must be adequate to cause the particles to flow upwards in a spiral then descend.

The following is an explanation of the granulating process which takes place in the depicted device which embodies the subject manner of the invention.

The process can be divided into steps 1 to 4 as follows:

1. A is the sprinkled region where the sprinkled granulating agent fuses with (adheres to) the particles.
2. B is the region in the downward flow where the granulating agent which adheres to the surface of the particles tends to cause fusion of the particles
3. C is the bottom-most region of the downward stream where the density of the particles is the greatest and where fusion of the particles becomes more intense.
4. D is the region where the particles are picked up by the gas stream to be spiralled upwards.

One important factor is the fact that centrifugal force caused by the spiralling flow acts upon the particles. The flowing force of the upwardly directed jet stream of pressurized gas ejected from the nozzles acts with the frictional forces produced by the particles contacting the cylinder wall to impart a tumbling motion to the particles during their spiralling ascent. The grapelike cluster of particles formed during the descent of the particles in descent region B and bottom-most descent region C are gradually formed into spherical granules during the spiralling tumbling ascent in region D. To conclude, the total batch of particles passes through sprinkler region A, descent region B, lower descent region C, and spiralling tumbling ascent region D and circulates continuously until the particles adhere to form spherical granules.

Spherical granules which are of high specific gravity and of lower solubility require a small upward angle of inclination of the nozzles which results in a longer dwell time in region D where spiralling tumbling motion is imparted to the particles.

Grapelike granules of low specific gravity and high solubility require a large upward angle of inclination of the nozzles which results in a short dwell time in region D where spiralling tumbling motion is imparted to the particles.

It is also possible to change the size of the granules by controlling the amount of sprinkling of the granulating agent, the length of time of sprinkling, amount of pressurized gas used for ejecting, temperature of the gas, and the length of time of gas ejection.

The size of the described device permits treating 10–10,000 liters of particles in one batch.

The following are examples of applications of this invention:

EXAMPLE 1

Fine powdered lactose: 35 kg. starch: 12 kg. powdered peptic agent: 3 kg. coloring: small amount. These ingredients are made to spirally flow within the cylinder. Pure water in the amount of 6 kg. is sprinkled within 8 minutes resulting in 90 percent of the basic powders formed into granules of 10–60 mesh size.

EXAMPLE 2

Powdered sugar of 200 mesh; 50 kg. lactose powder: 20 kg. powdered cocoa: 15 kg. artificial sweetening: 15 kg. These ingredients are spirally flowed within the cylinder. A solution of 50 percent sugar in 18 kg. of water is sprinkled during a period of 10 minutes after which, the spiral flow producing jet is changed to 40°C. hot air and the contents dried for a period of 1 hour. Ninety percent of the basic material was formed into instant cocoa granules of 30–80 mesh.

EXAMPLE 3

Powdered flour: 50 kg. is spirally flowed within the cylinder. Flour 10 percent Water 90 percent solution: 15 kg. is sprinkled for a period of 10 minutes after which hot air at 130 °C. is injected to produce the spiral flow for a period of 20 minutes, during which the product is completely dried to produce instantly soluble granules of 30–80 mesh size.

EXAMPLE 4

Fine powdered dyeing agent: 50 kg. is spirally circulated within the cylinder while pure water in the amount of 15 kg. is sprinkled during a period of 10 minutes resulting in 75 percent of of the basic material formed into 30–80 mesh instantly soluble granular dye.

EXAMPLE 5

Very fine pigment powder, 5 microns in diameter, which is easily blown as dust and difficult to disperse in water: 50 kg. is spirally circulated within the cylinder for a period of 10 minutes while 15 kg. of pure water is applied to thereby produce pigment granules with sizes ranging 5–40 micron.

Conventionally fine powder pigment requires approximately 1 hour of mechanical mixing to pigment in water wherein the granular powder was dispersed in water by mixing by hand. Furthermore, if gum, gluten, surface activating agent is added to the pure water, granules with sizes 10–80 micron can be obtained.

EXAMPLE 6

Two kinds of synthetic resin stabilizers with powder sizes 1–10 micron: 50 kg. is spirally circulated and oil-type surface activator 1 kg. is sprinkled during a time period of 3 minutes. A granular product with granular size of 70 micron was obtained.

EXAMPLE 7

Instant soup basic ingredient power 50 kg. is spirally circulated within the cylinder. To this is sprinkled a 10 percent solution of cornstarch 5 kg. for period of 10 minutes to produce 47 kg. of granular product with 30–60 mesh.

EXAMPLE 8

Powder dextrose: 100 kg. is wetted evenly with 5 kg. of pure water after 10 minutes of spirally circulating in the cylinder, the gas jet is changed to hot air at 120°C. and the contents circulated for a period of 15 minutes resulting in 70 kg. of 30–80 mesh granular dextrose.

What I claim is:

1. An apparatus for producing granules from particles comprising a cylindrical vessel, means adjacent the upper end for admitting particles to be coated, means at the lower end of the vessel for injecting a gas tangential and axial to the inner wall of the cylinder to produce a spiral flow of gas from said one end to the other end to move them upwardly in a spiralling and tumbling manner, exhaust means at the upper end for exhausting the gas, inlet means adjacent said upper end for injecting a granulating agent, and means at said lower end for removing the granules.

2. An apparatus as defined in claim 1 wherein the means for injecting the gas comprises a plurality of nozzles and means mounting each said nozzle for injecting a stream of gas having an axis extending tangential and axially of the inner wall.

3. An apparatus as defined in claim 1 wherein the means for admitting the particles comprising a conduit having a discharge end in the cylindrical wall of the vessel.

4. An apparatus as defined in claim 3 wherein the means for injecting the granulating agent comprises a conduit having an exhaust along the axis of the vessel.

5. An apparatus as defined in claim 4 further including a valve in each conduit for controlling the rate of flow of the conducted material.

6. An apparatus as defined in claim 2 further including means for regulating the pressure of the gas supplied to the nozzles.

7. An apparatus as defined in claim 1 wherein the means for removing the granules comprises a conduit having an inlet at said one end and a valve in said conduit for controlling the flow of granules therethrough.

* * * * *